US011006437B2

(12) United States Patent
Zhang et al.

(10) Patent No.: US 11,006,437 B2
(45) Date of Patent: May 11, 2021

(54) CARRIER AGGREGATION-BASED DEMODULATION METHOD AND APPARATUS

(71) Applicant: Huawei Technologies Co., Ltd., Shenzhen (CN)

(72) Inventors: Qiuhua Zhang, Shanghai (CN); Xulei Xue, Shanghai (CN); Jifeng Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 22 days.

(21) Appl. No.: 16/579,412

(22) Filed: Sep. 23, 2019

(65) Prior Publication Data

US 2020/0022165 A1 Jan. 16, 2020

Related U.S. Application Data

(63) Continuation of application No. PCT/CN2017/077562, filed on Mar. 21, 2017.

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/0026* (2013.01); *H04L 1/0061* (2013.01); *H04L 1/1816* (2013.01); *H04L 5/10* (2013.01)

(58) Field of Classification Search
CPC ......... H04W 72/1226; H04W 72/1231; H04W 72/1236; H04W 72/1263; H04W 72/1268;
(Continued)

(56) References Cited

U.S. PATENT DOCUMENTS

2014/0086078 A1 3/2014 Malladi et al.
2014/0295909 A1 10/2014 Ouchi et al.
(Continued)

FOREIGN PATENT DOCUMENTS

| CN | 102014480 A | 4/2011 |
| CN | 103596278 A | 2/2014 |
| CN | 103874212 A | 6/2014 |

OTHER PUBLICATIONS

Garner, "IEEE 1588 Version 2," pp. 1-89, Institute of Electrical and Electronics Engineers, New York, New York (Sep. 24, 2008).
(Continued)

*Primary Examiner* — Paul H Masur
(74) *Attorney, Agent, or Firm* — Leydig, Voit & Mayer, Ltd.

(57) ABSTRACT

A method for carrier aggregation-based demodulation is provided, which includes: when uplink data sent by UE based on a scheduled SCC is received, if a current moment is a periodic CQI reporting moment and a first PCC scheduling result of the UE is not received when a demodulation format used for demodulating the uplink data needs to be determined before the current moment, demodulating the uplink data respectively based on a first demodulation format and a second demodulation format, to obtain a first demodulation result, a second demodulation result, a first check result, and a second check result; and if the first PCC scheduling result is already received when the demodulation is completed, determining, based on the first PCC scheduling result, the first demodulation result, the second demodulation result, the first check result, and the second check result, a demodulation result of correctly demodulating the uplink data.

20 Claims, 10 Drawing Sheets

(51) Int. Cl.
*H04L 1/00* (2006.01)
*H04L 5/10* (2006.01)

(58) Field of Classification Search
CPC ... H04L 1/0023; H04L 1/0026; H04L 1/0061;
H04L 1/1812; H04L 1/1816; H04L 5/02;
H04L 5/06; H04L 5/10
See application file for complete search history.

(56) References Cited

U.S. PATENT DOCUMENTS

| 2015/0280877 | A1  | 10/2015 | Chen et al. |
| 2017/0005770 | A1  | 1/2017  | Shimezawa et al. |
| 2019/0037438 | A1* | 1/2019  | Chen .................... H04W 28/04 |

OTHER PUBLICATIONS

"Discussion on CA issues for shortened TTI operation," 3GPP TSG RAN WG1 Meeting #87, Reno, USA, R1-1611193, Total 4 pages, 3rd Generation Partnership Project, Valbonne, France (Nov. 14-18, 2016).

"SUCI on sPUSCH," 3GPP TSG RAN WG1 Meeting #87, Reno, USA, R1-1611162, Total 3 pages, 3rd Generation Partnership Project, Valbonne, France (Nov. 14-18, 2016).

"Discussion on CSI feedback for short TTI," 3GPP TSG RAN WG1 Meeting #87, Reno, USA, R1-1611166, Total 3 pages, 3rd Generation Partnership Project, Valbonne, France (Nov. 14-18, 2016).

* cited by examiner

When receiving the HARQ retransmission data sent by the UE, the first base station demodulates the HARQ retransmission data respectively based on the first demodulation format and the second demodulation format, and obtains, from a demodulation process, third demodulation data and fourth demodulation data on which HARQ combination can be performed ⎯⎯ 109

If the first base station already receives, when demodulating the HARQ retransmission data respectively based on the first demodulation format and the second demodulation format, the second PCC scheduling result sent by the second base station, the first base station selects second target demodulation data from the third demodulation data and the fourth demodulation data based on the second PCC scheduling result, where the second target demodulation result is demodulation data in a correct demodulation format that is indicated by the second PCC scheduling result ⎯⎯ 114

The first base station performs HARQ combination on the first target demodulation data and the second target demodulation data, and determines a third combination demodulation result based on demodulation data obtained after the combination ⎯⎯ 115

The first base station determines, based on the third combination demodulation result, the demodulation result of correctly demodulating the uplink data on the SCC ⎯⎯ 116

FIG. 1F

CARRIER AGGREGATION-BASED DEMODULATION METHOD AND APPARATUS

CROSS-REFERENCE TO RELATED APPLICATIONS

This application is a continuation of International Application No. PCT/CN2017/077562, filed on Mar. 21, 2017, the disclosure of which is hereby incorporated by reference in its entirety

TECHNICAL FIELD

Embodiments of this application relate to the field of wireless communications technologies, and in particular, to a carrier aggregation-based demodulation method and apparatus.

BACKGROUND

Currently, a carrier aggregation (CA) technology is introduced in a long term evolution-advanced version (LTE-A). The CA technology can aggregate a plurality of consecutive or nonconsecutive component carriers (CC), to form a wider spectrum for data transmission, thereby increasing a data transmission rate. An aggregated carrier includes one primary component carrier (PCC) and one or more secondary component carriers (SCC). User equipment (UE) may send uplink data to a base station through an allocated PCC and SCC, and may report a periodic CQI (Channel Quality Indicator) to the base station.

Specifically, three periodic CQI report mechanisms are specified in a CA scenario, including: 1. When uplink scheduling is performed on the PCC of the UE, a periodic CQI is sent on a physical uplink shared channel (PUSCH) of the PCC in a form of channel associated signaling, that is, there is periodic CQI channel associated signaling on the PUSCH of the PCC; 2. When no uplink scheduling is performed on the PCC of the UE but uplink scheduling is performed on the SCC of the UE, a periodic CQI is sent on a PUSCH of the SCC in a form of channel associated signaling, that is, there is periodic CQI channel associated signaling on the PUSCH of the SCC; and 3. When no uplink scheduling is performed on the PCC and the SCC, a periodic CQI is sent on a physical uplink control channel (PUCCH) of the PCC. For the foregoing three periodic CQI report mechanisms, in an inter-base station carrier aggregation scenario including a primary base station and a secondary base station, the primary base station is configured to perform uplink scheduling on the PCC, the secondary base station is configured to perform uplink scheduling on the SCC, and after the primary base station completes the uplink scheduling on the PCC and the secondary base station completes the uplink scheduling on the SCC, the primary base station needs to send a PCC uplink scheduling result to the secondary base station, so that the secondary base station can determine, in advance with reference to PCC and SCC uplink scheduling results, a demodulation format used for demodulating uplink data on the SCC, that is, when receiving, at a periodic CQI reporting moment, uplink data transmitted on the SCC, the secondary base station determines, in advance, whether to demodulate the uplink data on the SCC based on a format used when there is periodic CQI channel associated signaling on the PUSCH or a format used when there is no periodic CQI channel associated signaling on the PUSCH. However, in an inter-base station carrier aggregation scenario based on relaxed backhaul, that is, a scenario in which there is a relatively high transmission delay, for example, an inter-base station carrier aggregation scenario in which a transmission delay is greater than 2 ms, because there is a relatively high transmission delay between the primary base station and the secondary base station, after the secondary base station completes the uplink scheduling on the SCC, when needing to determine the demodulation format used for demodulating the uplink data on the SCC, the secondary base station may not receive the PCC uplink scheduling result sent by the primary base station. Consequently, whether uplink scheduling is performed on the PCC cannot be determined, and whether there is periodic CQI channel associated signaling on the PUSCH of the SCC cannot be determined, either. Consequently, a correct demodulation format cannot be determined in advance. In this case, when receiving, at the periodic CQI reporting moment, the uplink data transmitted on the SCC, the secondary base station does not learn a demodulation format used for demodulation.

To resolve a problem that in the inter-base station carrier aggregation scenario based on relaxed backhaul, the base station does not learn, at the periodic CQI reporting moment, a format used for demodulating the uplink data on the SCC, the prior art provides an SCC scheduling avoidance method, that is, the secondary base station does not perform uplink scheduling on the SCC at the periodic CQI reporting moment, that is, the UE does not transmit uplink data on the SCC. Because uplink scheduling on the SCC is avoided at the periodic CQI reporting moment, the secondary base station does not need to demodulate the uplink data on the SCC at the periodic CQI reporting moment. However, in the method, a particular uplink scheduling opportunity is lost on the SCC, and consequently, an uplink data transmission rate is affected.

SUMMARY

To resolve a prior-art problem that an uplink scheduling opportunity is lost on an SCC, and consequently, an uplink data transmission rate is affected, embodiments of this application provide a carrier aggregation-based demodulation method and apparatus. The technical solutions are as follows:

According to a first aspect, a carrier aggregation-based demodulation method is provided. The method includes:

when a first base station cannot receive, in advance, a PCC scheduling result sent by a second base station and determine a demodulation format, directly performing, by the first base station, dual-demodulation on uplink data on an SCC at a periodic CQI reporting moment, that is, performing demodulation respectively based on two formats, namely, a format used when there is periodic CQI channel associated signaling on a PUSCH of the SCC and a format used when there is no periodic CQI channel associated signaling on a PUSCH of the SCC; and when receiving the PCC scheduling result, determining, based on the PCC scheduling result and demodulation results of the dual-demodulation, a demodulation result of correctly demodulating the uplink data, thereby increasing a demodulation success probability of the uplink data on the SCC at the periodic CQI moment.

Because the uplink data on the SCC at the periodic CQI moment can be successfully demodulated, the SCC at the periodic CQI moment can be allocated to the UE for transmitting the uplink data, without a need to avoid uplink scheduling on the SCC, thereby increasing available resources for transmitting the uplink data by the UE, and increasing an uplink data transmission rate.

During specific implementation, when the PCC scheduling result is received, if the PCC scheduling result indicates that the uplink scheduling is performed on a PCC, a final demodulation result is determined based on a first demodulation result that is obtained by performing demodulation based on that there is periodic CQI channel associated signaling on the PUSCH of the SCC; or when the PCC scheduling result indicates that no uplink scheduling is performed on a PCC, a final demodulation result is determined based on a second demodulation result that is obtained by performing demodulation based on that there is no periodic CQI channel associated signaling on the PUSCH of the SCC. In this way, a demodulation result in a correct demodulation format can be accurately determined in the demodulation results of the dual-demodulation based on the PCC scheduling result that is received in a delayed manner.

During specific implementation, a demodulation process of the dual-demodulation further includes a check process. If the PCC scheduling result is not received when the dual-demodulation is completed, the first base station may further determine, based on a check result, whether there is a correct checked demodulation result in the demodulation results of the dual-demodulation, and when there is a correct checked demodulation result in the demodulation results of the dual-demodulation, directly determine the correct checked demodulation result as the final demodulation result. The correct checked demodulation result is determined as the final demodulation result, to resolve a problem that a correct demodulation result cannot be obtained when the PCC scheduling result is further delayed, that is, when the dual-demodulation is completed but the PCC scheduling result is still not received.

During specific implementation, when there is no correct checked demodulation result in the demodulation results of the dual-demodulation, the first base station may alternatively send a HARQ retransmission indication to the UE, and wait to receive the PCC scheduling result that is sent in a delayed manner, select a first target demodulation result in the correct demodulation format from the demodulation results of the dual-demodulation based on the PCC scheduling result that is sent in a delayed manner, and perform dual-demodulation on HARQ retransmission data, to obtain two pieces of demodulation data on which HARQ combination can be performed. If a PCC scheduling result during data retransmission is not received when the dual-demodulation is performed on the HARQ retransmission data, HARQ combination is performed on the two pieces of demodulation data respectively with the first target demodulation data, and if there is still no correct checked demodulation result in two demodulation results obtained based on the combination, a HARQ retransmission indication is re-sent, and the PCC scheduling result waits to be received, until the UE performs the last retransmission.

A HARQ data retransmission mechanism is introduced, and HARQ combination is performed on initially transmitted data and retransmission data, to obtain a correct demodulation result by using combined data when a demodulation error is caused by another factor, thereby further increasing the demodulation success probability of the uplink data on the SCC at the periodic CQI moment.

During specific implementation, if the PCC scheduling result during the data retransmission is already received when the dual-demodulation is performed on the HARQ retransmission data, demodulation data in the correct demodulation format is selected, based on the PCC scheduling result during the data retransmission, from the two pieces of demodulation data obtained by performing the dual-demodulation on the HARQ retransmission data, and HARQ combination is performed on the demodulation data in the correct demodulation format in the HARQ retransmission data and demodulation data in the correct demodulation format in the initially transmitted data, to obtain the combination demodulation result in the correct demodulation format, so that the final demodulation result is directly determined based on the combination demodulation result in the correct demodulation format. In this way, flexibility and accuracy of determining the final demodulation result are improved.

During specific implementation, two combination demodulation results are obtained through the HARQ data retransmission, the dual-demodulation, and the HARQ combination, and when determining, through the check, that there is a correct checked demodulation result in the two combination demodulation results, the first base station may further directly determine the correct checked demodulation result as the final demodulation result. In this way, flexibility and accuracy of determining the final demodulation result are further improved.

According to a second aspect, a carrier aggregation-based demodulation apparatus is provided. The carrier aggregation-based demodulation apparatus has a function of implementing an action in the carrier aggregation-based demodulation method according to the first aspect. The carrier aggregation-based demodulation apparatus includes at least one module, where the at least one module is configured to implement the carrier aggregation-based demodulation method according to the first aspect.

According to a third aspect, a carrier aggregation-based demodulation apparatus is provided. A structure of the carrier aggregation-based demodulation apparatus includes a processor and a memory. The memory is configured to: store a program for supporting the carrier aggregation-based demodulation apparatus in performing the carrier aggregation-based demodulation method according to the first aspect, and store data used in the carrier aggregation-based demodulation method according to the first aspect. The processor is configured to execute the program stored in the memory. The carrier aggregation-based demodulation apparatus may further include a communications bus, where the communications bus is configured to establish a connection between the processor and the memory.

According to a fourth aspect, a computer-readable storage medium is provided. The computer-readable storage medium stores an instruction, and when the instruction runs on a computer, the computer is enabled to perform the carrier aggregation-based demodulation method according to the first aspect.

According to a fifth aspect, a computer program product including an instruction is provided. When the instruction runs on a computer, the computer is enabled to perform the carrier aggregation-based demodulation method according to the first aspect.

Technical effects achieved by the second aspect, the third aspect, the fourth aspect, and the fifth aspect are similar to a technical effect achieved by a corresponding technical method according to the first aspect. Details are not described herein again.

The technical solutions provided in the embodiments of this application have the following beneficial effects:

In the embodiments of this application, when the first base station cannot receive, in advance, the PCC scheduling result sent by the second base station and determine the demodulation format, the first base station may directly perform the dual-demodulation on the uplink data on the SCC at the periodic CQI moment, that is, perform the demodulation respectively based on the two formats, namely, a format used when there is the periodic CQI channel associated signaling on the PUSCH of the SCC and a format used when there is no periodic CQI channel associated signaling on the PUSCH of the SCC, and when receiving the PCC scheduling result, determine the final demodulation result based on the PCC scheduling result and the demodulation results of the dual-demodulation, thereby increasing the demodulation success probability of the uplink data on the SCC at the periodic CQI moment. Because the uplink data on the SCC at the periodic CQI moment can be successfully demodulated, the SCC at the periodic CQI moment can be allocated to the UE for transmitting the uplink data, without a need to avoid the uplink scheduling on the SCC, thereby increasing the available resources for transmitting the uplink data by the UE, and increasing the uplink data transmission rate.

BRIEF DESCRIPTION OF DRAWINGS

FIG. 1F is a flowchart of still another carrier aggregation-based demodulation method according to an embodiment of this application;

DESCRIPTION OF EMBODIMENTS

To make the objectives, technical solutions, and advantages of this application clearer, the following further describes the implementations of this application in detail with reference to the accompanying drawings.

An application scenario of embodiments of this application is first described before the embodiments of this application are described in detail. The embodiments of this application are mainly applied to an inter-base station carrier aggregation scenario based on relaxed backhaul, for example, an IP radio access network carrier aggregation (IPRAN CA) scenario.

Figure 1A:
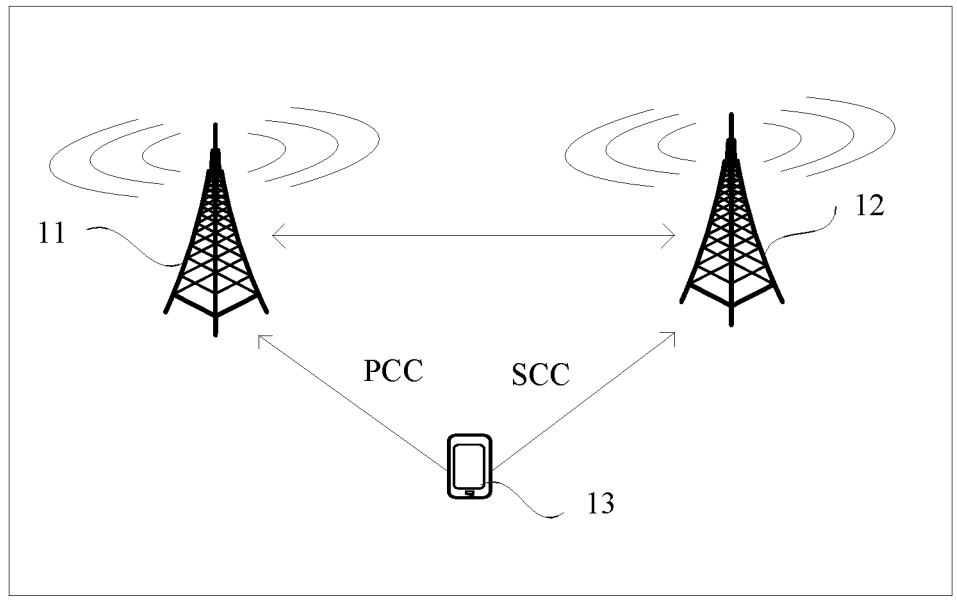
FIG. 1A is a schematic diagram of an inter-base station carrier aggregation scenario based on relaxed backhaul according to an embodiment of this application.

The inter-base station carrier aggregation scenario is a scenario in which carrier aggregation is performed based on component carriers of different base stations, including one primary base station and one or more secondary base stations. The primary base station corresponds to a PCC, and is configured to perform uplink scheduling on the PCC. The secondary base station corresponds to an SCC, and is configured to perform uplink scheduling on the SCC. FIG. 1A is a schematic diagram of an inter-base station carrier aggregation scenario based on relaxed backhaul according to an embodiment of this application. As shown in FIG. 1A, the inter-base station carrier aggregation scenario includes a base station 11, a base station 12, and UE 13. The base station 11 is a primary base station, and the base station 12 is a secondary base station. The two base stations can serve the UE 13 by using an inter-base station carrier aggregation technology. That is, the UE 13 may transmit uplink data to the base station 11 through a PCC scheduled by the base station 11, or may transmit uplink data to the base station 12 through an SCC scheduled by the base station 12; and when receiving the uplink data of the UE, the base station 12 may further send the uplink data to the base station 11, and the base station 11 processes the uplink data.

However, in the inter-base station carrier aggregation scenario based on relaxed backhaul, as shown in FIG. 1A, the base station 11 sends a PCC scheduling result to the base station 12, and the base station 12 cannot immediately receive the PCC scheduling result, and can receive the PCC scheduling result only after a transmission delay. Because of the transmission delay, after the secondary base station completes the uplink scheduling on the SCC, when needing to determine a demodulation format used for demodulating the uplink data on the SCC, the secondary base station may not receive an uplink scheduling result on the PCC that is sent by the primary base station, and consequently cannot determine a correct demodulation format in advance.

For example, in a currently planned inter-base station carrier aggregation scenario based on relaxed backhaul, a maximum inter-base station unidirectional transmission delay is usually less than or equal to 4 ms. In addition, according to timing requirements of scheduling and demodulation, when completing the uplink scheduling on the SCC at a CQI reporting moment, the secondary base station usually needs to determine, after 2 ms, the demodulation format used for demodulating the uplink data on the SCC, to prepare demodulation based on the determined demodulation format, and receives, after 2 ms, the uplink data that is sent by the UE on the scheduled SCC, and needs to perform demodulation based on the pre-determined demodulation format. That is, a time interval between the scheduling and determining of the demodulation format is 2 ms, and a time interval between determining of the demodulation format and the demodulation is also 2 ms, and therefore, a time interval between the scheduling and the demodulation is 4 ms.

An example in which an inter-base station transmission delay is greater than 2 ms is used. When the primary base station completes the uplink scheduling on the PCC, and the secondary base station completes the uplink scheduling on the SCC, the primary base station sends a PCC uplink scheduling result to the secondary base station. After 2 ms, when the secondary base station needs to determine, based on the PCC scheduling result of the primary base station, the demodulation format used for demodulating the uplink data on the SCC, because a transmission delay between the primary base station and the secondary base station is greater than 2 ms, the secondary base station does not receive the PCC scheduling result of the primary base station at this time, and consequently, cannot determine the corresponding demodulation format in advance. After 2 ms, when the secondary base station receives the uplink data that is transmitted by the UE on the scheduled SCC and needs to demodulate the uplink data, because the secondary base station does not determine the corresponding demodulation format in advance, the secondary base station cannot successfully demodulate the uplink data at this time, and consequently, cannot obtain, through the demodulation, the data that is transmitted by the UE on the SCC, leading to a data transmission failure.

During actual application, the secondary base station includes a physical layer (L1) and a media access control (MAC) layer (L2). L2 is used to determine, based on the PCC scheduling result of the primary base station, the demodulation format used for demodulating the uplink data on the SCC, and send a demodulation indication to L1. The demodulation indication carries the determined demodulation format, and is used to instruct L1 to perform demodulation based on the determined demodulation format. L1 is used to receive the demodulation indication sent by the L2 layer, and demodulate the uplink data on the SCC based on the demodulation indication.

For example, assuming that the inter-base station transmission delay is less than or equal to 2 ms, after 2 ms after the scheduling is completed, the secondary base station can receive the PCC uplink scheduling result sent by the primary base station, and may determine, through L2 based on the PCC scheduling result, the demodulation format used for demodulating the uplink data on the SCC, to send a demodulation indication to L1. Assuming that the PCC uplink scheduling result indicates that no uplink scheduling is performed on the PCC of the UE, the demodulation indication is used to instruct L1 to demodulate the uplink data on the SCC based on a format used when there is no periodic CQI channel associated signaling on a PUSCH. After 2 ms, when receiving the uplink data that is sent by the UE on the SCC, the secondary base station may demodulate the uplink data through L1 based on the scheduling indication and the format used when there is no periodic CQI channel associated signaling on the PUSCH.

However, if the inter-base station transmission delay is greater than 2 ms, when needing to determine the demodulation format used for demodulating the uplink data on the SCC, the secondary base station does not receive the PCC scheduling result sent by the primary base station, and consequently, cannot send a demodulation indication to L1 through L2. Consequently, when receiving the uplink data that is sent by the UE on the SCC, the secondary base station cannot demodulate the uplink data through L1 based on the demodulation indication.

To resolve a problem in a related technology that a format used for demodulating uplink data on an SCC cannot be learned at a periodic CQI reporting moment, and avoid a loss of an uplink scheduling opportunity of the SCC, an embodiment of this application provides a carrier aggregation-based demodulation method, to successfully demodulate the uplink data on the SCC at the periodic CQI moment, without a need to avoid uplink scheduling on the SCC, thereby increasing available resources for transmitting the uplink data by UE, and increasing an uplink data transmission rate.

Figure 1B:
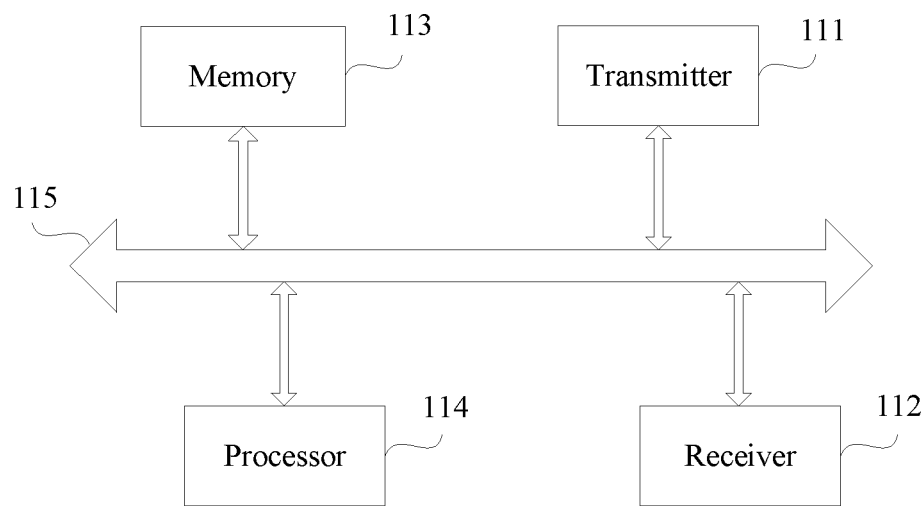
FIG. 1B is a schematic structural diagram of a secondary base station according to an embodiment of this application.

The method provided in this embodiment of this application is mainly applied to the secondary base station in the inter-base station carrier aggregation scenario based on relaxed backhaul. FIG. 1B is a schematic structural diagram of a secondary base station 11 according to an embodiment of this application. Referring to FIG. 1B, the secondary base station 11 mainly includes a transmitter 111, a receiver 112, a memory 113, a processor 114, and a communications bus 115. A person skilled in the art may understand that, a structure of the secondary base station 11 shown in FIG. 1B does not constitute a limitation on the secondary base station 11, and the secondary base station 11 may include more or fewer components than those shown in the figure, or combine some components, or have a different component arrangement. This is not limited in this embodiment of this application.

The transmitter 111 and the receiver 112 are configured to communicate with another device. For example, a PCC scheduling result of a primary base station may be received by using the receiver 112, or uplink data that is sent by UE on an SCC may be received by using the receiver 112, or an SCC scheduling result may be sent to a primary base station by using the transmitter 111. The memory 113 may be configured to store data, for example, may be configured to store the PCC scheduling result sent by the primary base station or the uplink data sent by the UE. In addition, the memory 113 may be configured to store one or more running programs and/or modules for performing the carrier aggregation-based demodulation method.

The processor 114 is a control center of the secondary base station 11. The processor 114 may be a central processing unit (CPU), a microprocessor, an application-specific integrated circuit (ASIC), or one or more integrated circuits configured to control program execution of the solutions in this embodiment of this application. The processor 114 may run or execute the software program and/or the module stored in the memory 113, and invoke data stored in the memory 113, to implement a carrier aggregation-based demodulation method provided in the following embodiment.

The communications bus 115 may include a path for transmitting information between the processor 114 and the memory 113.

Figure 1C:
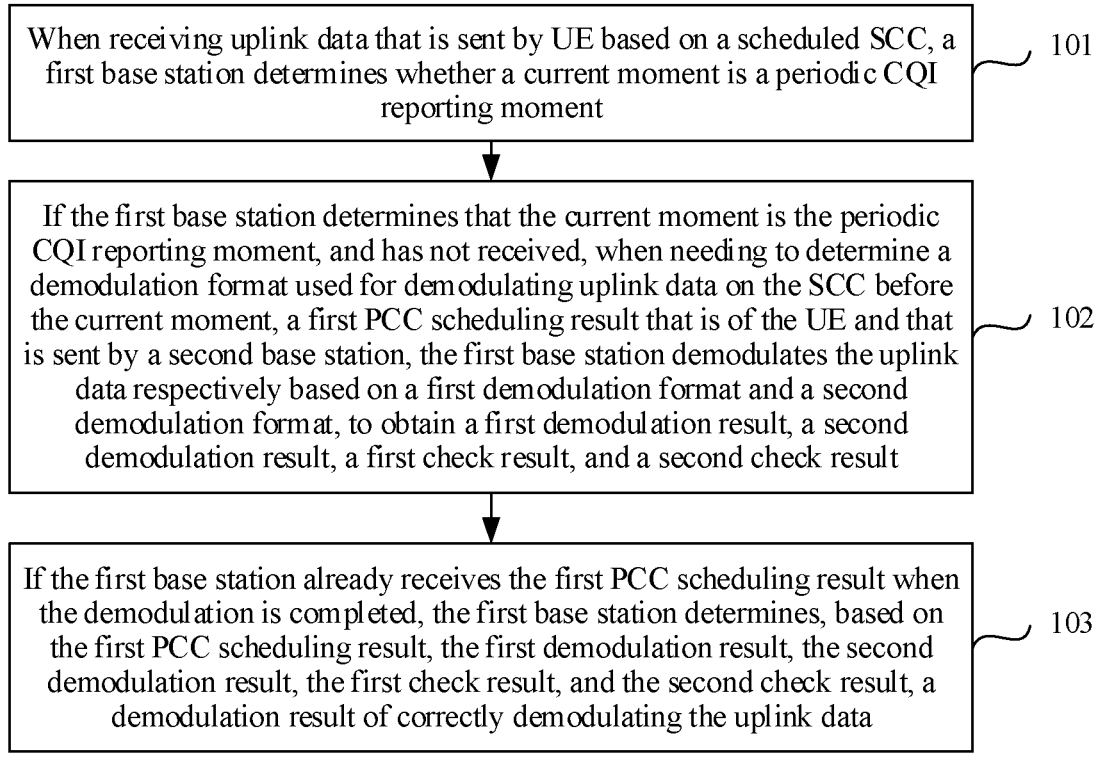
FIG. 1C is a flowchart of a carrier aggregation-based demodulation method according to an embodiment of this application.

FIG. 1C is a flowchart of a carrier aggregation-based demodulation method according to an embodiment of this application. Interaction entities of the method include UE, a first base station, and a second base station. The first base station may be a secondary base station, and the second base station may be a primary base station. Referring to FIG. 1C, the method includes the following steps.

Step 101: When receiving uplink data that is sent by the UE based on a scheduled SCC, the first base station determines whether a current moment is a periodic CQI reporting moment.

The uplink data may be specifically sent on a PUSCH of the SCC, and the PUSCH is an uplink channel for data transmission. A CQI is a communication quality indicator of a radio channel, and is used to indicate channel quality of a given channel; and a higher CQI value indicates better channel quality. In a wireless communications system, the UE needs to monitor each communications channel allocated to the UE, and needs to periodically report a CQI of each communications channel. A CQI report period may be set through negotiation between the base station and the UE.

At an aperiodic CQI reporting moment, the UE may directly send to-be-sent target data on the SCC. At a periodic CQI reporting moment, when needing to send target data on the SCC, the UE needs to send not only the target data on the SCC but also a CQI. However, the CQI may be sent on the SCC with the target data, or may be sent on a scheduled PCC. The aperiodic CQI reporting moment is a moment other than the periodic CQI reporting moment, that is, a moment at which no CQI needs to be reported.

During actual application, before the UE sends the uplink data based on the scheduled SCC, when the second base station completes uplink scheduling on the PCC, the second base station sends PCC uplink scheduling information to a corresponding UE; and when the first base station completes uplink scheduling on the SCC, the first base station also sends SCC uplink scheduling information to a corresponding UE. Therefore, when the UE needs to send the target data based on the scheduled SCC at the CQI reporting moment, the UE may first determine, based on the PCC uplink scheduling information and the SCC uplink scheduling information of the UE, whether uplink scheduling is performed on the PCC and the SCC of the UE at the CQI reporting moment, and determine, based on a determining result, whether to send a periodic CQI on the SCC with the target data. Specifically, if uplink scheduling is performed on both the PCC and the SCC, the UE sends the periodic CQI on the scheduled PCC; and in this case, the uplink data on the SCC includes only the target data without including the periodic CQI. If no uplink scheduling is performed on the PCC, but uplink scheduling is performed on the SCC, the UE sends both the target data and the periodic CQI through the scheduled SCC; and in this case, the uplink data on the SCC includes the target data and periodic CQI channel associated signaling.

Because the uplink data may include different content at different moments, when receiving the uplink data that is sent by the UE based on the scheduled SCC, the first base station may first determine whether the current moment is the periodic CQI reporting moment. If the current moment is not the periodic CQI reporting moment, the first base station directly demodulates the uplink data based on a demodulation format used when there is no periodic CQI channel associated signaling on the PUSCH of the SCC; or if the current moment is the periodic CQI reporting moment, the first base station performs the following step 102.

Step 102: If the first base station determines that the current moment is the periodic CQI reporting moment, and has not received, when needing to determine a demodulation format used for demodulating uplink data on the SCC before the current moment, a first PCC scheduling result that is of the UE and that is sent by the second base station, the first base station demodulates the uplink data respectively based on a first demodulation format and a second demodulation format, to obtain a first demodulation result, a second demodulation result, a first check result, and a second check result.

The first PCC scheduling result is used to indicate whether uplink scheduling is performed on the PCC of the UE at the periodic CQI reporting moment. The first demodulation format is a demodulation format used when there is periodic CQI channel associated signaling on the PUSCH of the SCC. The second demodulation format is a demodulation format used when there is no periodic CQI channel associated signaling on the PUSCH of the SCC. The first demodulation result is a demodulation result obtained by demodulating the uplink data based on the first demodulation format. The second demodulation result is a demodulation result obtained by demodulating the uplink data based on the second demodulation format. The first check result is obtained by checking the first demodulation result in a cyclic redundancy check (Cyclic Redundancy Check, CRC) manner. The second check result is obtained by checking the second demodulation result in the CRC manner. A check result may be used to indicate whether a corresponding demodulation result is correct.

In this embodiment of this application, if the first base station has not received, when needing to determine the demodulation format used for demodulating the uplink data on the SCC, the first PCC scheduling result that is of the UE and that is sent by the second base station, the first base station may first perform dual-demodulation on the uplink data, that is, perform the demodulation respectively based on the demodulation format used when there is periodic CQI channel associated signaling on the PUSCH of the SCC and the demodulation format used when there is no periodic CQI channel associated signaling on the PUSCH of the SCC.

In addition, a demodulation process includes a check processing step, that is, when a demodulation result is obtained through demodulation, a CRC check is further performed on the demodulation result, to obtain a check result. Therefore, when the demodulation is completed, both the demodulation result and the check result are obtained. The CRC check is a most commonly used method for performing error detection on data transmission by using an error detection check code in the field of data communications, and can be used to check correctness and integrity of transmitted data. Therefore, the check result of the demodulation result may be used to indicate whether the corresponding demodulation result is correct.

It should be noted that, in this embodiment of this application, only an example in which the first base station has not received, when needing to determine the demodulation format used for demodulating the uplink data on the SCC before the current moment, the first PCC scheduling result that is of the UE and that is sent by the second base station is used for description. However, in another embodiment, if the first base station already receives, when needing to determine the demodulation format used for demodulating the uplink data on the SCC before the current moment, the first PCC scheduling result that is of the UE and that is sent by the second base station, the first base station may determine the demodulation format based on the first PCC scheduling result when needing to determine the demodulation format used for demodulating the uplink data on the SCC, and demodulate the uplink data based on the determined demodulation format.

In a specific embodiment, if the first base station has not received, when needing to determine the demodulation format used for demodulating the uplink data on the SCC before the current moment, the first PCC scheduling result that is of the UE and that is sent by the second base station, the first base station may send a first demodulation indication to L1 through L2. The first demodulation indication is used to instruct L1 to perform the dual-demodulation on the uplink data, that is, demodulate the uplink data respectively based on the first demodulation format and the second demodulation format. If the first base station already receives the first PCC scheduling result of the UE when needing to determine the demodulation format used for demodulating the uplink data on the SCC before the current moment, the first base station may determine, through L2 based on the first PCC scheduling result, the demodulation format used for demodulating the uplink data, and send a second demodulation indication to L1 through L2. The second demodulation indication carries the determined demodulation format, and is used to indicate, to L1, that the determined demodulation format is a correct demodulation format, so that L1 performs the demodulation based on the determined demodulation format.

Step 103: If the first base station already receives, when the demodulation is completed, the first PCC scheduling result sent by the second base station, the first base station determines, based on the first PCC scheduling result, the first demodulation result, the second demodulation result, the first check result, and the second check result, a demodulation result of correctly demodulating the uplink data.

The demodulation result of correctly demodulating the uplink data means that the uplink data is demodulated by using the correct demodulation format, to obtain complete data content, for example, the target data, or the target data and the periodic CQI, transmitted by the UE on the SCC.

The determining, by the first base station based on the first PCC scheduling result, the first demodulation result, the second demodulation result, the first check result, and the second check result, a demodulation result of correctly demodulating the uplink data includes either of the following manners:

In a first implementation: when the first PCC scheduling result indicates that uplink scheduling is performed on the PCC of the UE at the periodic CQI reporting moment, the first base station determines, based on the second demodulation result and the second check result, the demodulation result of correctly demodulating the uplink data.

When uplink scheduling is performed on the PCC of the UE, it indicates that the periodic CQI is sent by the UE on the scheduled PCC, there is no periodic CQI in the uplink data on the SCC, and in a dual-demodulation process, the second demodulation format is a correct demodulation format. Therefore, the first base station may determine, based on the second check result and the second demodulation result that is obtained by performing the demodulation based on the second demodulation format, the demodulation result of correctly demodulating the uplink data.

Specifically, the determining, by the first base station based on the second demodulation result and the second check result, the demodulation result of correctly demodulating the uplink data includes either of the following manners:

(1) If it is determined, by using the second check result, that the second demodulation result is correct, the second demodulation result is determined as the demodulation result of correctly demodulating uplink data.

(2) If it is determined, by using the second check result, that the second demodulation result is incorrect, second demodulation data is determined, and a hybrid automatic repeat request (HARQ) retransmission indication is sent to the UE, to determine, based on subsequent HARQ retransmission data and the second demodulation data, the demodulation result of correctly demodulating uplink data.

The second demodulation data is data on which HARQ combination can be performed and that is obtained in a process of demodulating the uplink data based on the second demodulation format, and may be specifically data on which the HARQ combination can be performed and that is obtained before decoding processing in the demodulation process. The HARQ retransmission indication is used to instruct the UE to send HARQ retransmission data based on the SCC.

When it is determined, by using the second check result, that the second demodulation result is incorrect, it indicates that although the demodulation format is correct, a demodulation failure is also caused due to another interference factor (for example, a high interference scenario or a weak coverage scenario), and consequently, the second demodulation result obtained through the demodulation is incorrect. In this case, the UE also needs to be instructed to retransmit data, the retransmitted data is combined with demodulation data in a previous demodulation process, and the demodulation result of correctly demodulating the uplink data is determined based on combined data.

A HARQ is a technology formed by combining forward error correction encoding (FEC) and an automatic repeat request (ARQ). When a demodulation result includes an error, although demodulation data corresponding to the demodulation result cannot be correctly decoded, the demodulation data still includes particular useful information. Therefore, the useful information can be used to combine the demodulation data and retransmission data for decoding, to increase a demodulation success rate. In addition, in a retransmission process, an additional redundancy bit may be retransmitted. More redundancy bits are retransmitted to reduce a channel code rate, thereby increasing a decoding success rate. If normal decoding still cannot be performed after the retransmitted redundancy bit is added, retransmission is performed again. As a quantity of retransmissions is increased, redundancy bits are continuously accumulated, and the channel code rate is continuously reduced, so that a better decoding effect can be obtained.

Specifically, a process in which the first base station determines, based on the HARQ retransmission data and the second demodulation data, the demodulation result of correctly demodulating the uplink data includes: when receiving the HARQ retransmission data sent by the UE, demodulating, by the first base station, the HARQ retransmission data respectively based on the first demodulation format and the second demodulation format, and obtaining, from a demodulation process, third demodulation data and fourth demodulation data on which HARQ combination can be performed; if the first base station already receives, during the demodulation, a second PCC scheduling result sent by the second base station, selecting, by the first base station, second target demodulation data from the third demodulation data and the fourth demodulation data based on the second PCC scheduling result; performing HARQ combination on the second demodulation data and the second target demodulation data, obtaining a combination demodulation result based on combined demodulation data, and checking the combination demodulation result; and if the first base station determines, through the check, that the demodulation result is correct, determining, by the first base station, the combination demodulation result as the demodulation result of correctly demodulating the uplink data; or if the first base station determines, through the check, that the demodulation result is incorrect, re-sending, by the first base station, a HARQ retransmission indication to the UE, until a quantity of times of sending a HARQ retransmission indication to the UE reaches a preset quantity.

The second PCC scheduling result is used to indicate whether uplink scheduling is performed on the PCC of the UE at a HARQ retransmission data moment; and the second target demodulation result is demodulation data in the correct demodulation format that is indicated by the second PCC scheduling result. The preset quantity may be set through negotiation between the first base station and the UE, and is usually 4, that is, the UE usually performs a maximum of four HARQ retransmissions. In addition, if a demodulation result obtained through the preset quantity of retransmissions is still incorrect, the first base station stops sending a HARQ retransmission indication to the UE, and discards an obtained demodulation result.

In another embodiment, if the first base station does not receive, during the demodulation, the second PCC scheduling result sent by the second base station, the first base station performs HARQ combination on the third demodulation data and the fourth demodulation data respectively with the second demodulation data, and decodes and checks combined demodulation data, to obtain two demodulation results and corresponding check results. When determining, by using the corresponding check results, that there is a correct checked demodulation result in the two demodulation results, the first base station determines the correct checked demodulation result as the demodulation result of correctly demodulating the uplink data; or when determining, by using the corresponding check results, that there is no correct checked demodulation result in the two demodulation results, the first base station re-sends HARQ retransmission indication to the UE, until the quantity of times of sending a HARQ retransmission indication to the UE reaches a preset quantity.

In a second implementation, when the first PCC scheduling result indicates that no uplink scheduling is performed on the PCC of the UE at the periodic CQI reporting moment, the first base station determines, based on the first demodulation result and the first check result, the demodulation result of correctly demodulating the uplink data.

When no uplink scheduling is performed on the PCC of the UE, it indicates that the periodic CQI is sent by the UE on the SCC, there is a periodic CQI in the uplink data on the SCC, and in a dual-demodulation process, the first demodulation format is a correct demodulation format. Therefore, the first base station may determine, based on the first check result and the first demodulation result that is obtained by performing the demodulation based on the first demodulation format, the demodulation result of correctly demodulating the uplink data.

The implementation of determining, by the first base station based on the first demodulation result and the first check result, the demodulation result of correctly demodulating the uplink data is similar to the implementation of determining, by the first base station based on the second demodulation result and the second check result, the demodulation result of correctly demodulating the uplink data. Details are not described herein again.

In this embodiment of this application, when the first base station cannot receive, in advance, the PCC scheduling result sent by the second base station and determine the demodulation format, the first base station may directly perform the dual-demodulation on the uplink data on the SCC at the periodic CQI moment, that is, perform the demodulation respectively based on the two formats, namely, a format used when there is the periodic CQI channel associated signaling on the PUSCH of the SCC and a format used when there is no periodic CQI channel associated signaling on the PUSCH of the SCC, and when receiving the PCC scheduling result, determine a final demodulation result based on the PCC scheduling result and the demodulation results of the dual-demodulation, thereby increasing a demodulation success probability of the uplink data on the SCC at the periodic CQI moment. Because the uplink data on the SCC at the periodic CQI moment can be successfully demodulated, the SCC at the periodic CQI moment can be allocated to the UE for transmitting the uplink data, without a need to avoid uplink scheduling on the SCC, thereby increasing available resources for transmitting the uplink data by the UE, and increasing an uplink data transmission rate.

Figure 1D:
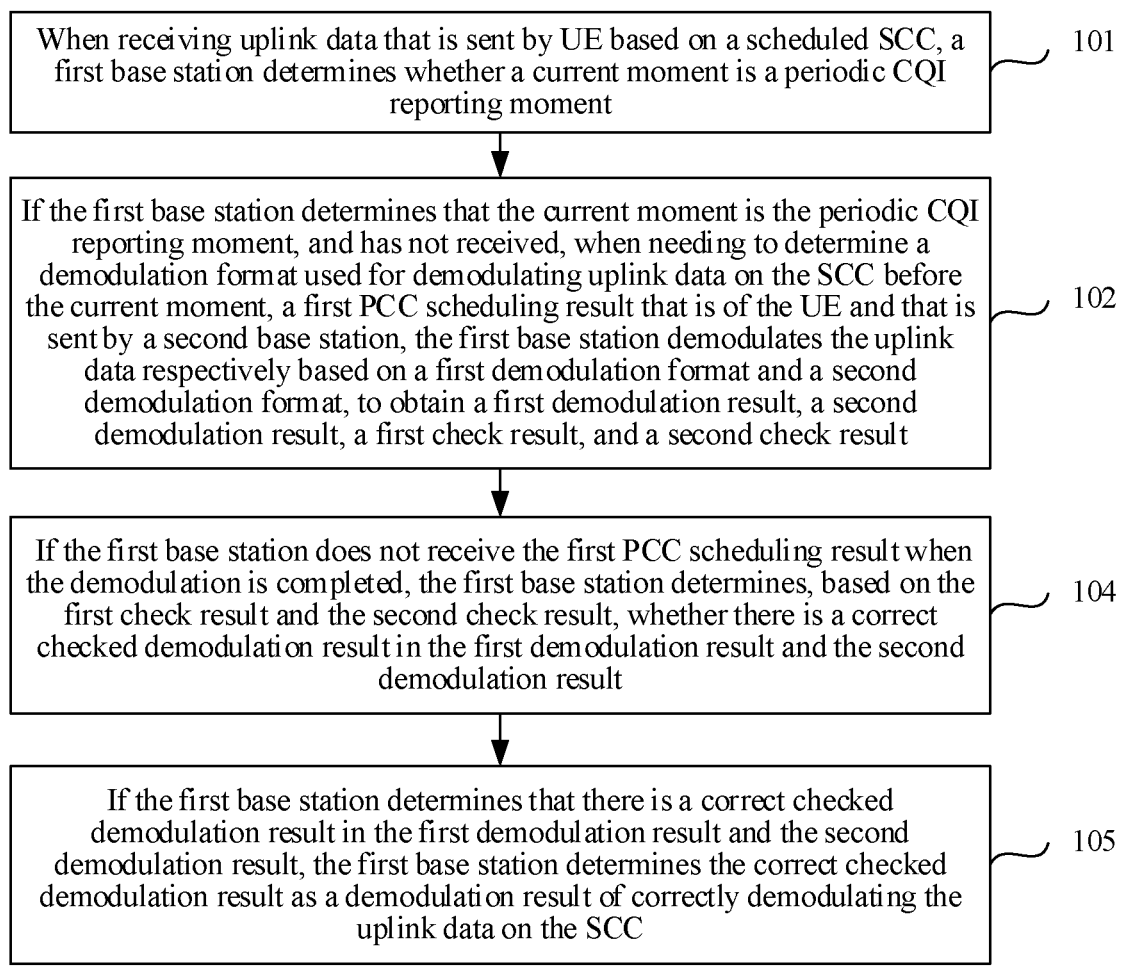
FIG. 1D is a flowchart of another carrier aggregation-based demodulation method according to an embodiment of this application.

It should be noted that, in the embodiment in FIG. 1C, only an example in which the first base station already receives, when the uplink data is completely demodulated, the first PCC scheduling result sent by the second base station is used. However, in another embodiment, the first base station may not receive, when the uplink data is completely demodulated, the first PCC scheduling result sent by the second base station, for example, in a case in which a transmission delay between the second base station and the first base station is greater than 4 ms. FIG. 1D is a flowchart of another carrier aggregation-based demodulation method according to an embodiment of this application. As shown in FIG. 1D, the method further includes step 104 and step 105.

Step 101: When receiving uplink data that is sent by UE based on an SCC, a first base station determines whether a current moment is a periodic CQI reporting moment.

Step 102: If the first base station determines that the current moment is the periodic CQI reporting moment, and has not received, when needing to determine a demodulation format used for demodulating uplink data on the SCC before the current moment, a first PCC scheduling result that is of the UE and that is sent by a second base station, the first base station demodulates the uplink data respectively based on a first demodulation format and a second demodulation format, to obtain a first demodulation result, a second demodulation result, a first check result, and a second check result.

Step 104: If the first base station does not receive, when the demodulation is completed, the first PCC scheduling result sent by the second base station, the first base station determines, based on the first check result and the second check result, that there is a correct checked demodulation result in the first demodulation result and the second demodulation result.

Specifically, the first base station may determine, based on the first check result, whether the first demodulation result is correct, and determine, based on the second check result, whether the second demodulation result is correct. If either of the demodulation results is correct, it may be determined whether there is a correct checked demodulation result in the first demodulation result and the second demodulation result; or if the two demodulation results are both incorrect, it may be determined that there is no correct checked demodulation result in the first demodulation result and the second demodulation result.

In an embodiment, when the first base station receives the first PCC scheduling result that is of the UE and that is sent by the second base station, the first base station may determine, through L2 based on the first PCC scheduling result, the demodulation format used for demodulating the uplink data, and send a second demodulation indication to L1. The second demodulation indication carries the determined demodulation format, and is used to indicate, to L1, that the determined demodulation format is a correct demodulation format of the uplink data. Therefore, if L1 of the first base station does not receive, when the demodulation is completed, the second demodulation indication sent by L2, L1 may determine whether there is a correct checked demodulation result in the first demodulation result and the second demodulation result.

Step 105: If the first base station determines that there is a correct checked demodulation result in the first demodulation result and the second demodulation result, the first base station determines the correct checked demodulation result as a demodulation result of correctly demodulating the uplink data on the SCC.

Because the correct checked demodulation result is inevitably a demodulation result obtained by performing the demodulation based on the correct demodulation format, in this case, the first base station can directly determine, based on an indication of a PCC scheduling result that is sent by the second base station, the correct checked demodulation result as the demodulation result of correctly demodulating the uplink data on the SCC. For example, if the first demodulation result is correct, the first demodulation result is determined as the demodulation result of correctly demodulating the uplink data; or if the second demodulation result is correct, the second demodulation result is determined as the demodulation result of correctly demodulating the uplink data.

In this embodiment of this application, when the first base station cannot receive, in advance, the PCC scheduling result sent by the second base station and determine the demodulation format, the first base station may directly perform dual-demodulation on the uplink data on the SCC at the periodic CQI moment; and if the first base station does not receive the first PCC scheduling result when the demodulation is completed, the first base station may directly determine a correct checked demodulation result in demodulation results obtained through the dual-demodulation, as a final demodulation result, thereby increasing a demodulation success probability of the uplink data on the SCC at the periodic CQI moment. Because the uplink data on the SCC at the periodic CQI moment can be successfully demodulated, the SCC at the periodic CQI moment can be allocated to the UE for transmitting the uplink data, without a need to avoid uplink scheduling on the SCC, thereby increasing available resources for transmitting the uplink data by the UE, and increasing an uplink data transmission rate.

Figures 1, 1E:
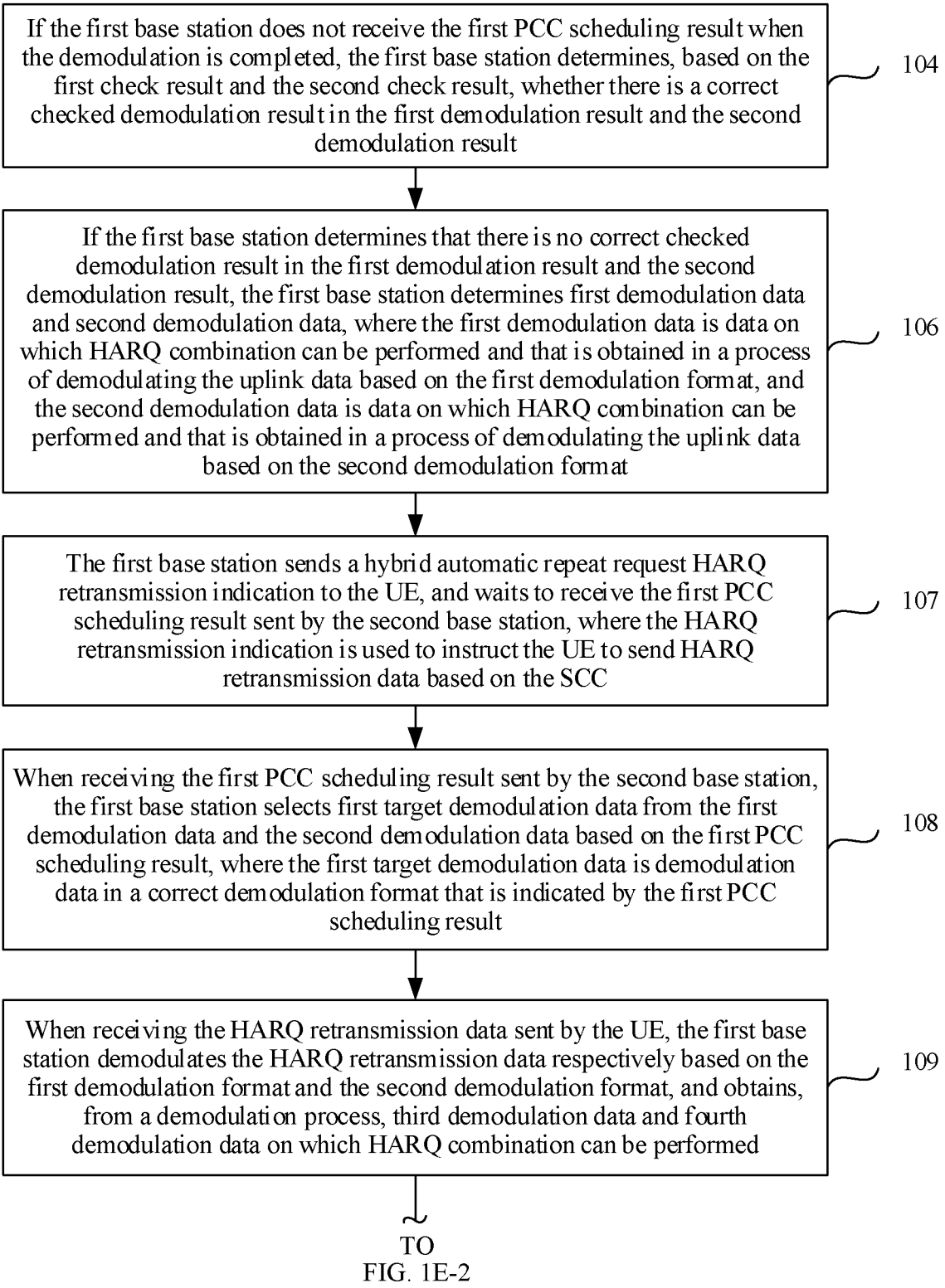
FIG. 1E-1 and FIG. 1E-2 are a flowchart of still another carrier aggregation-based demodulation method according to an embodiment of this application.
Figures 1, 1E, 2:
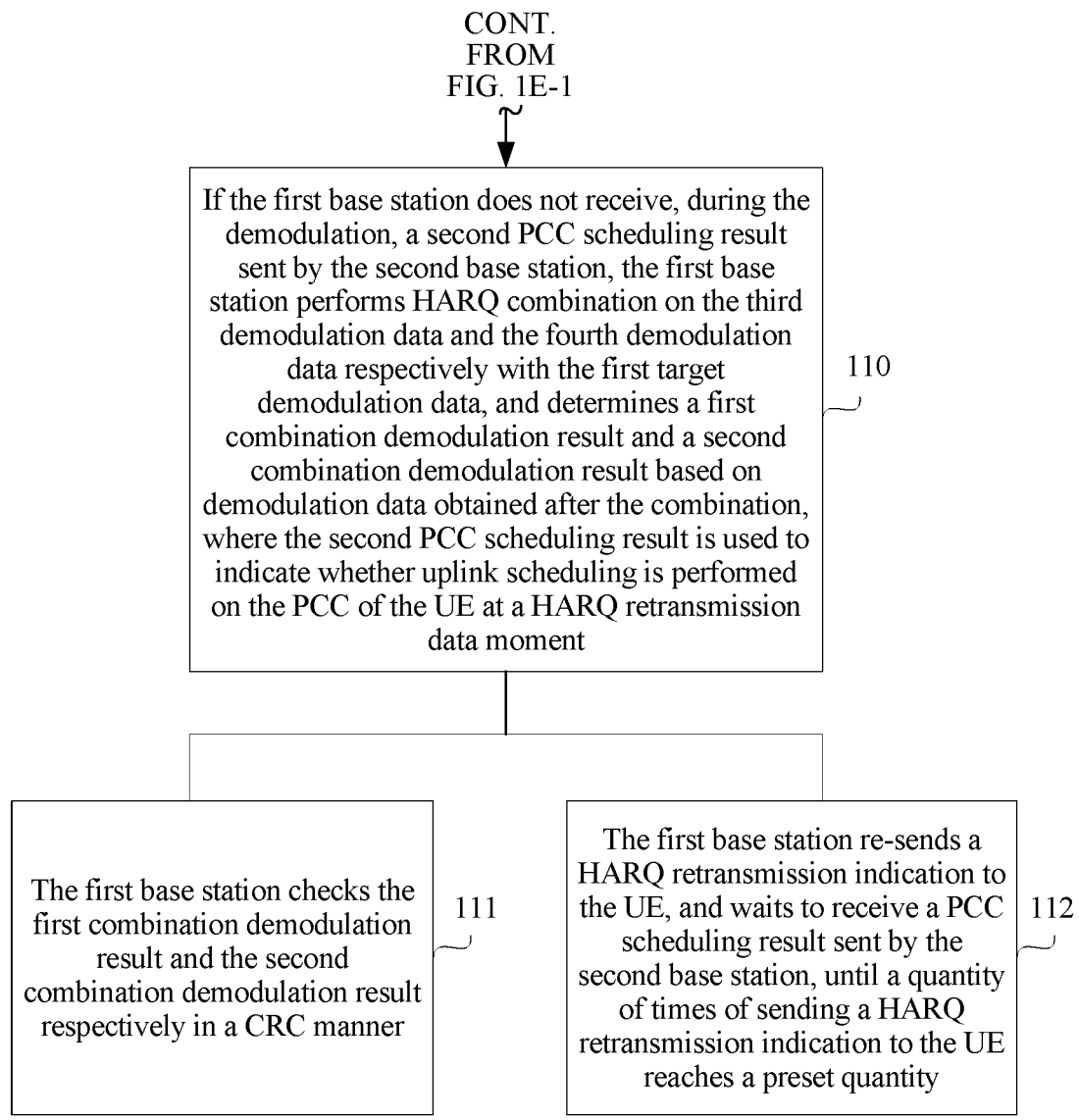

It should be noted that, in the embodiment in FIG. 1D, only an example in which the first base station determines, through the determining in step 104, that there is a correct checked demodulation result in the first demodulation result and the second demodulation result is used. However, in another embodiment, there may be no correct checked demodulation result in the first demodulation result and the second demodulation result. That is, as shown in FIG. 1E-1 and FIG. 1E-2, after step 104, the method may further include the following step 106 to step 111 and any branch after step 111.

Step 106: If the first base station determines that there is no correct checked demodulation result in the first demodulation result and the second demodulation result, the first base station determines first demodulation data and second demodulation data, where the first demodulation data is data on which HARQ combination can be performed and that is obtained in a process of demodulating the uplink data based on the first demodulation format, and the second demodulation data is data on which HARQ combination can be performed and that is obtained in a process of demodulating the uplink data based on the second demodulation format.

The demodulation data is data on which the HARQ combination can be performed and that is obtained before decoding processing in the demodulation process. Determining of the demodulation data is obtaining of data before the decoding processing in the demodulation process. For example, the data may be soft bit data to be decoded by a decoder.

Step 107: The first base station sends a hybrid automatic repeat request HARQ retransmission indication to the UE, and waits to receive the first PCC scheduling result sent by the second base station, where the HARQ retransmission indication is used to instruct the UE to send HARQ retransmission data based on the SCC.

A purpose of waiting to receive the first PCC scheduling result sent by the second base station is to determine, based on the first PCC scheduling result, demodulation data in the correct demodulation format in the first demodulation data and the second demodulation data, so as to perform HARQ combination subsequently.

Step 108: When receiving the first PCC scheduling result sent by the second base station, the first base station selects first target demodulation data from the first demodulation data and the second demodulation data based on the first PCC scheduling result, where the first target demodulation data is demodulation data in a correct demodulation format that is indicated by the first PCC scheduling result.

Specifically, if the first PCC scheduling result is used to indicate that uplink scheduling is performed on the PCC of the UE at the periodic CQI reporting moment, the first base station determines the second demodulation data as the first target demodulation data; or if the first PCC scheduling result is used to indicate that no uplink scheduling is performed on the PCC of the UE at the periodic CQI reporting moment, the first base station determines the first demodulation data as the first target demodulation data.

Step 109: When receiving the HARQ retransmission data sent by the UE, the first base station demodulates the HARQ retransmission data respectively based on the first demodulation format and the second demodulation format, and obtains, from a demodulation process, third demodulation data and fourth demodulation data on which HARQ combination can be performed.

The data obtained before the decoding processing in the demodulation process may be specifically obtained as the demodulation data, for example, soft bit data on which decoding processing is to be performed and that is sent to the decoder in the demodulation process is obtained as the demodulation data. The third demodulation data is data on which HARQ combination can be performed and that is obtained in a process of demodulating the HARQ retransmission data based on the first demodulation format, and the fourth demodulation data is data on which HARQ combination can be performed and that is obtained in a process of demodulating the HARQ retransmission data based on the second demodulation format.

Step 110: If the first base station does not receive, during the demodulation, a second PCC scheduling result sent by the second base station, the first base station performs HARQ combination on the third demodulation data and the fourth demodulation data respectively with the first target demodulation data, and determines a first combination demodulation result and a second combination demodulation result based on demodulation data obtained after the combination, where the second PCC scheduling result is used to indicate whether uplink scheduling is performed on the PCC of the UE at a HARQ retransmission data moment.

The HARQ combination is performed on the third demodulation data and the fourth demodulation data respectively with the first target demodulation data, to obtain first combination demodulation data and second combination demodulation data. Correspondingly, the determining a first combination demodulation result and a second combination demodulation result based on demodulation data obtained after the combination includes: performing decoding processing on the first combination demodulation data and the second combination demodulation data respectively, to obtain the first combination demodulation result and the second combination demodulation result.

In a specific embodiment, when the first base station receives the second PCC scheduling result that is of the UE and that is sent by the second base station, the first base station may determine, through L2 based on the second PCC scheduling result, a demodulation format used for demodulating the HARQ retransmission data, and send a second demodulation indication to L1 through L2. The second demodulation indication carries the determined demodulation format, and is used to indicate, to L1, that the determined demodulation format is a correct demodulation format of the HARQ retransmission data. Therefore, if L1 of the first base station does not receive, when the HARQ retransmission data is demodulated, the second demodulation indication sent by L2, L1 may perform the HARQ combination on the third demodulation data and the fourth demodulation data respectively with the first target demodulation data, and determine the first combination demodulation result and the second combination demodulation result based on the demodulation data obtained after the combination.

Step 111: The first base station checks the first combination demodulation result and the second combination demodulation result respectively in a CRC manner.

After obtaining the first combination demodulation result and the second combination demodulation result, the first base station may check the first combination demodulation result and the second combination demodulation result respectively in the CRC manner. During actual application, L1 of the first base station may perform the check.

When it is determined, through the check, that there is no correct checked demodulation result in the first combination demodulation result and the second combination demodulation result, the following step 112 may be performed; or when it is determined, through the check, that there is a correct checked demodulation result in the first combination demodulation result and the second combination demodulation result, the following step 113 may be performed.

Step 112: The first base station re-sends a HARQ retransmission indication to the UE, and waits to receive a PCC scheduling result sent by the second base station, until a quantity of times of sending a HARQ retransmission indication to the UE reaches a preset quantity.

That is, when it is determined, through the check, that there is no correct checked demodulation result in the first combination demodulation result and the second combination demodulation result, the first base station may re-send the HARQ retransmission indication to the UE, and wait to receive the PCC scheduling result sent by the second base station, to determine, based on the subsequently received PCC scheduling result, combination demodulation data in the correct demodulation format from demodulation data obtained after previous retransmission and combination, combine, decode, and check the obtained combination demodulation data in the correct demodulation format and subsequent retransmission data, and determine a correct checked demodulation result as the demodulation result of correctly demodulating the uplink data on the SCC. If there is no correct checked demodulation result, the HARQ retransmission indication is re-sent to the UE, and the PCC scheduling result sent by the second base station waits to be received, until the quantity of times of sending a HARQ retransmission indication to the UE reaches a preset quantity.

The preset quantity may be set through negotiation between the first base station and the UE, and is usually 4, that is, the UE usually performs a maximum of four HARQ retransmissions. In addition, if a demodulation result obtained through the preset quantity of retransmissions is still incorrect, the first base station stops sending a HARQ retransmission indication to the UE, and discards an obtained demodulation result. For example, using an example in which the preset quantity is 4, after fourth-time HARQ retransmission data is received, if there is still no correct checked demodulation result in demodulation results obtained from the fourth-time retransmission data and combination demodulation data obtained in a third retransmission, sending of a HARQ retransmission indication to the UE may be stopped, and an obtained demodulation result is discarded. However, if there is a correct checked demodulation result, the correct checked demodulation result may be determined as the demodulation result of correctly demodulating the uplink data.

Step 113: The first base station determines a correct checked demodulation result as the demodulation result of correctly demodulating the uplink data.

That is, when determining, through the check, that there is a correct checked demodulation result in the first combination demodulation result and the second combination demodulation result, the first base station may directly determine the correct checked demodulation result as the demodulation result of correctly demodulating the uplink data, to obtain complete and accurate data content transmitted by the UE through the SCC, without a need to send a HARQ retransmission indication to the UE.

In this embodiment of this application, when the first base station cannot receive, in advance, the PCC scheduling result sent by the second base station and determine the demodulation format, the first base station may directly perform the dual-demodulation on the uplink data on the SCC at the periodic CQI moment; and if the first base station does not receive the first PCC scheduling result when the demodulation is completed, and there is no correct checked demodulation result in the demodulation results obtained through the dual-demodulation, the first base station may further send the retransmission indication to the UE, to determine the final demodulation result with reference to the demodulation results obtained through the dual-demodulation and the retransmission data, thereby increasing the demodulation success probability of the uplink data on the SCC at the periodic CQI moment. Because the uplink data on the SCC at the periodic CQI moment can be successfully demodulated, the SCC at the periodic CQI moment can be allocated to the UE for transmitting the uplink data, without a need to avoid uplink scheduling on the SCC, thereby increasing available resources for transmitting the uplink data by the UE, and increasing an uplink data transmission rate.

It should be noted that, in the embodiment in FIG. 1E-1 and FIG. 1E-2, only an example in which the first base station does not receive, when demodulating the HARQ retransmission data respectively based on the first demodulation format and the second demodulation format, the second PCC scheduling result sent by the second base station is used. However, in another embodiment, the first base station may already receive, when demodulating the HARQ retransmission data respectively based on the first demodulation format and the second demodulation format, the second PCC scheduling result sent by the second base station. That is, as shown in FIG. 1F, after step 109, the method may further include the following step 114 to step 116.

Step 114: If the first base station already receives, when demodulating the HARQ retransmission data respectively based on the first demodulation format and the second demodulation format, the second PCC scheduling result sent by the second base station, the first base station selects second target demodulation data from the third demodulation data and the fourth demodulation data based on the second PCC scheduling result, where the second target demodulation result is demodulation data in a correct demodulation format that is indicated by the second PCC scheduling result.

The second PCC scheduling result is used to indicate whether uplink scheduling is performed on the PCC of the UE at a HARQ retransmission data moment, and the first base station may determine, based on the second PCC scheduling result, the correct demodulation format used for demodulating the HARQ retransmission data, and then select demodulation data in the correct demodulation format from the third demodulation data and the fourth demodulation data, as the second target demodulation data.

In a specific embodiment, when the first base station receives the second PCC scheduling result of the UE, the first base station may determine, through L2 based on the second PCC scheduling result, the demodulation format used for demodulating the HARQ retransmission data, and send a second demodulation indication to L1 through L2. The second demodulation indication carries the determined demodulation format, and is used to indicate, to L1, that the determined demodulation format is a correct demodulation format of the HARQ retransmission data. Therefore, if L1 of the first base station already receives, when the HARQ retransmission data is demodulated, the second demodulation indication sent by L2, L1 may select the demodulation data in the correct demodulation format from the third demodulation data and the fourth demodulation data based on the second demodulation indication, as the second target demodulation data.

Step 115: The first base station performs HARQ combination on the first target demodulation data and the second target demodulation data, and determines a third combination demodulation result based on demodulation data obtained after the combination.

Specifically, the determining a third combination demodulation result based on demodulation data obtained after the combination includes: performing decoding processing on the demodulation data obtained after the combination, to obtain the third combination demodulation result.

Step 116: The first base station determines, based on the third combination demodulation result, the demodulation result of correctly demodulating the uplink data on the SCC.

Specifically, the determining, by the first base station based on the third combination demodulation result, the demodulation result of correctly demodulating the uplink data on the SCC includes: checking, by the first base station, the third combination demodulation result in the CRC manner; and if it is determined, through the check, that the third combination demodulation result is correct, determining the third combination demodulation result as the demodulation result of correctly demodulating the uplink data; or if it is determined, through the check, that the third combination demodulation result is incorrect, re-sending a HARQ retransmission indication to the UE, until the quantity of times of sending a HARQ retransmission indication to the UE reaches the preset quantity.

In this embodiment of this application, when the first base station cannot receive, in advance, the PCC scheduling result sent by the second base station and determine the demodulation format, the first base station may directly perform the dual-demodulation on the uplink data on the SCC at the periodic CQI moment; and if the first base station does not receive the first PCC scheduling result when the demodulation is completed, and there is no correct checked demodulation result in the demodulation results obtained through the dual-demodulation, the first base station may further send the retransmission indication to the UE, to determine the final demodulation result with reference to the demodulation results obtained through the dual-demodulation and the retransmission data, thereby increasing the demodulation success probability of the uplink data on the SCC at the periodic CQI moment. Because the uplink data on the SCC at the periodic CQI moment can be successfully demodulated, the SCC at the periodic CQI moment can be allocated to the UE for transmitting the uplink data, without a need to avoid uplink scheduling on the SCC, thereby increasing available resources for transmitting the uplink data by the UE, and increasing an uplink data transmission rate.

Figure 2A:
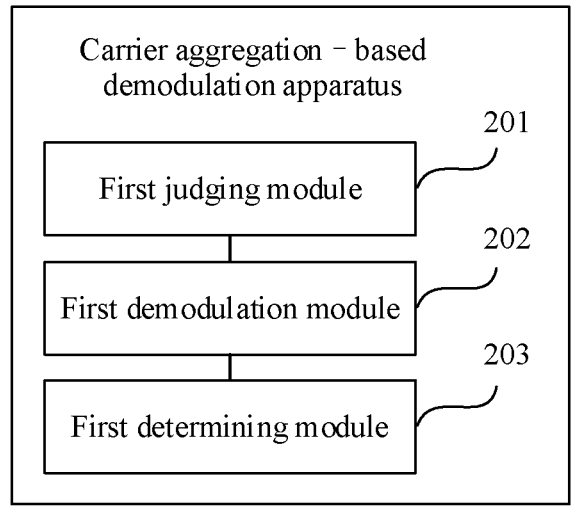
FIG. 2A is a schematic structural diagram of a carrier aggregation-based demodulation apparatus according to an embodiment of this application.

FIG. 2A is a schematic structural diagram of a carrier aggregation-based demodulation apparatus according to an embodiment of this application. The carrier aggregation-based demodulation apparatus may be implemented by software, hardware, or a combination thereof. Referring to FIG. 2A, the carrier aggregation-based demodulation apparatus may include:

a first judging module 201, configured to perform an operation performed by the first base station in step 101;

a first demodulation module 202, configured to perform an operation performed by the first base station in step 102; and a first determining module 203, configured to perform an operation performed by the first base station in step 103.

Figure 2B:
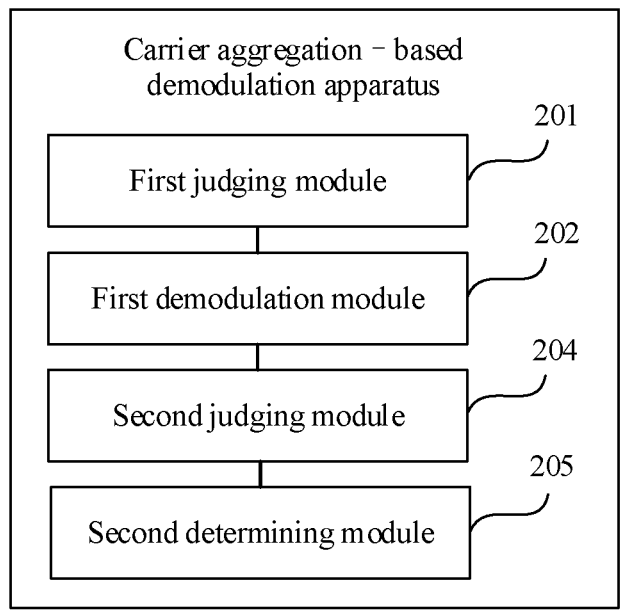
FIG. 2B is a schematic structural diagram of another carrier aggregation-based demodulation apparatus according to another embodiment of this application.

Optionally, referring to FIG. 2B, the apparatus further includes:

a second judging module 204, configured to perform an operation performed by the first base station in step 104; and a second determining module 205, configured to perform an operation performed by the first base station in step 105.

Figure 2C:
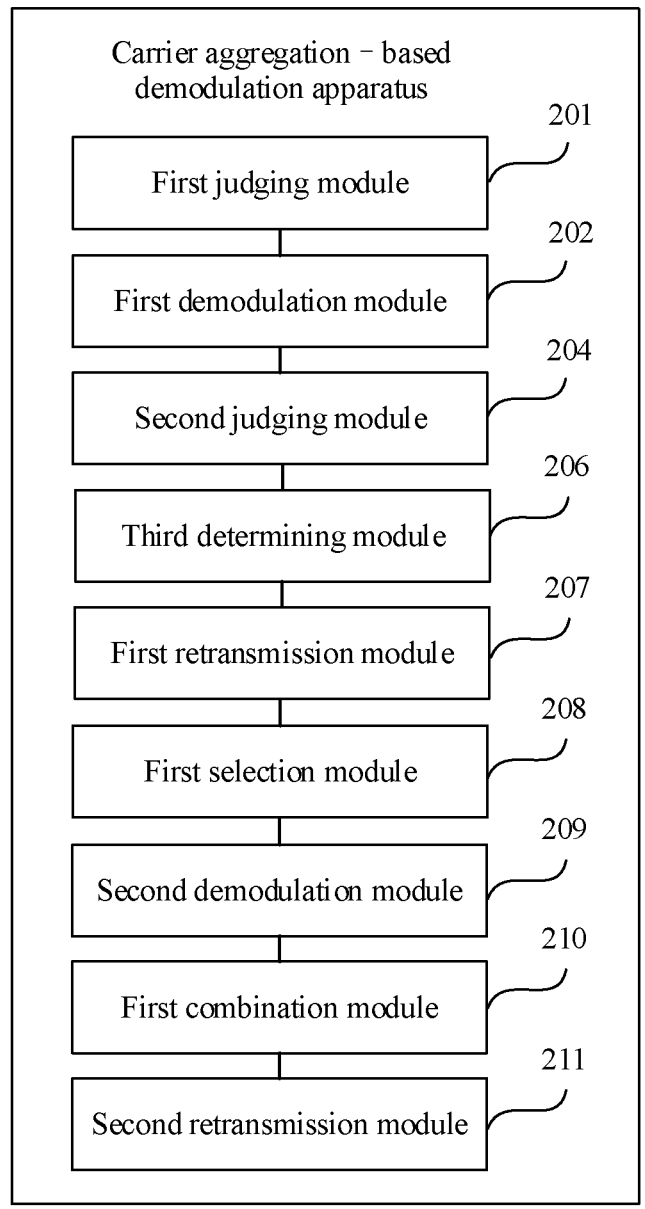
FIG. 2C is a schematic structural diagram of still another carrier aggregation-based demodulation apparatus according to an embodiment of this application.

Optionally, referring to FIG. 2C, the apparatus further includes:

a third determining module 206, configured to perform an operation performed by the first base station in step 106;

a first retransmission module 207, configured to perform an operation performed by the first base station in step 107;

a first selection module 208, configured to perform an operation performed by the first base station in step 108;

a second demodulation module 209, configured to perform an operation performed by the first base station in step 109;

a first combination module 210, configured to perform an operation performed by the first base station in step 110; and a second retransmission module 211, configured to perform operations performed by the first base station in step 111 and step 112.

Figure 2D:
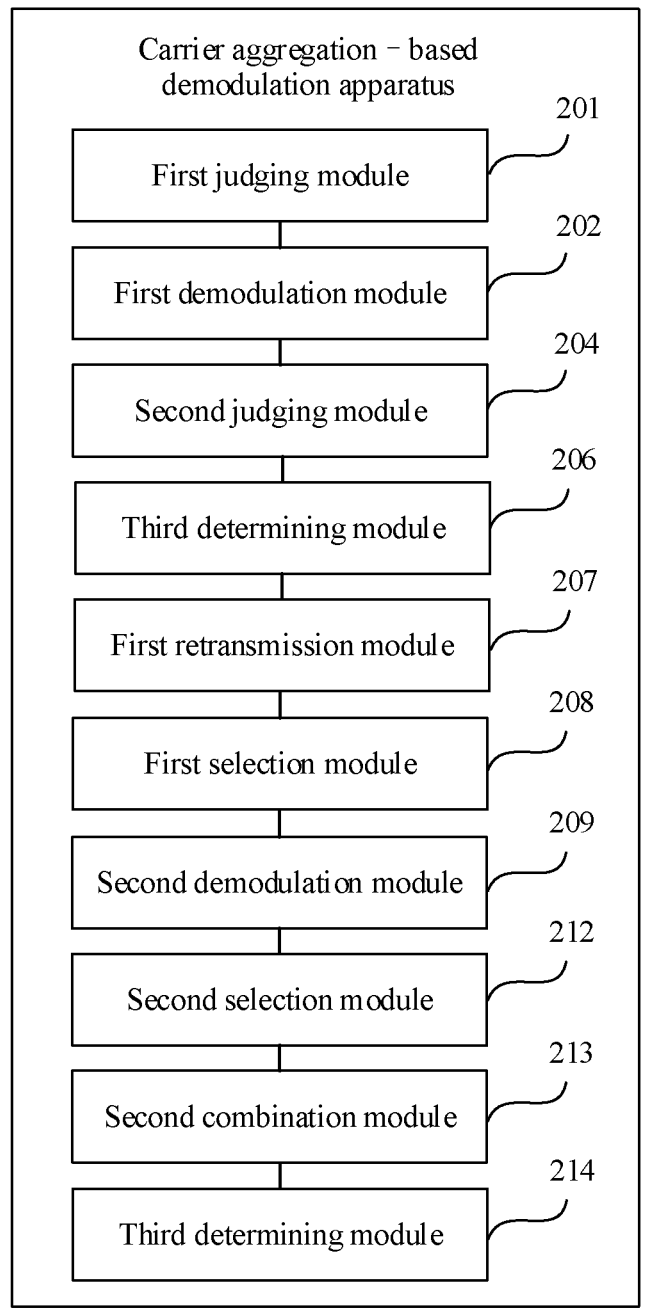
FIG. 2D is a schematic structural diagram of still another carrier aggregation-based demodulation apparatus according to an embodiment of this application.

Optionally, referring to FIG. 2D, the apparatus further includes:

a second selection module 212, configured to perform an operation performed by the first base station in step 114;

a second combination module 213, configured to perform an operation performed by the first base station in step 115; and a third determining module 214, configured to perform an operation performed by the first base station in step 116.

Figure 2E:
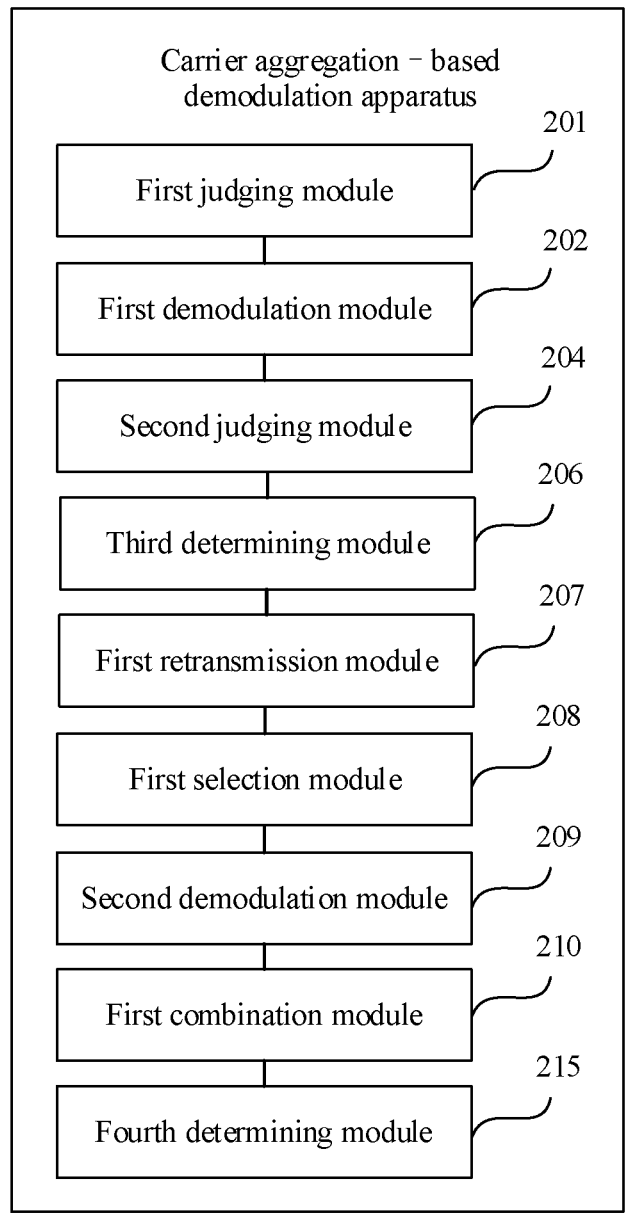
FIG. 2E is a schematic structural diagram of still another carrier aggregation-based demodulation apparatus according to an embodiment of this application.

Optionally, referring to FIG. 2E, the apparatus further includes:

a fourth determining module 215, configured to perform an operation performed by the first base station in step 113.

In this embodiment of this application, when the carrier aggregation-based demodulation apparatus cannot receive, in advance, the PCC scheduling result sent by the second base station and determine the demodulation format, the carrier aggregation-based demodulation apparatus may directly perform the dual-demodulation on the uplink data on the SCC at the periodic CQI moment; and if the carrier aggregation-based demodulation apparatus does not receive the first PCC scheduling result when the demodulation is completed, and there is no correct checked demodulation result in the demodulation results obtained through the dual-demodulation, the carrier aggregation-based demodulation apparatus may further send the retransmission indication to the UE, to determine the final demodulation result with reference to the demodulation results obtained through the dual-demodulation and the retransmission data, thereby increasing a demodulation success probability of the uplink data on the SCC at the periodic CQI moment. Because the uplink data on the SCC at the periodic CQI moment can be successfully demodulated, the SCC at the periodic CQI moment can be allocated to the UE for transmitting the uplink data, without a need to avoid uplink scheduling on the SCC, thereby increasing available resources for transmitting the uplink data by the UE, and increasing an uplink data transmission rate.

It should be noted that, when the carrier aggregation-based demodulation apparatus provided in the foregoing embodiment implements the carrier aggregation-based demodulation method, division of the foregoing functional modules is used as an example for description. During actual application, the foregoing functions can be allocated to different functional modules and implemented according to a requirement, that is, an inner structure of the device is divided into different functional modules to implement all or some of the functions described above. In addition, the carrier aggregation-based demodulation apparatus provided in the foregoing embodiment belongs to a same concept as the embodiment of the carrier aggregation-based demodulation method. For a specific implementation process of the carrier aggregation-based demodulation apparatus, refer to the method embodiment. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are embodiments of this application, but are not intended to limit this application. Any modification, equivalent replacement, or improvement made without departing from the spirit and principle of this application should fall within the protection scope of this application.

What is claimed is:

1. A carrier aggregation-based demodulation method comprising:
    determining, by a first base station, whether a current moment is a periodic channel quality indicator (COI) reporting moment in response to the first base station receiving uplink data sent by user equipment (UE) based on a scheduled secondary component carrier (SCC);
    demodulating, by the first base station, the uplink data based on first and second demodulation formats to obtain first and second demodulation results, respectively, and first and second check results, respectively, wherein the current moment is determined to be the periodic CQI reporting moment,
    wherein the first base station has not received a first primary component carrier (PCC) scheduling result of the UE sent by a second base station, which the first base station needs to determine a demodulation format for demodulating the uplink data sent on the SCC before the current moment,
    wherein the first PCC scheduling result indicates whether uplink scheduling is performed on a PCC of the UE at the periodic CQI reporting moment,
    wherein the first demodulation format is a demodulation format used when there is periodic CQI channel associated signaling on a physical uplink shared channel (PUSCH) of the SCC,
    wherein the second demodulation format is a demodulation format used when there is no periodic CQI channel associated signaling on the PUSCH of the SCC,
    wherein the first check result is obtained by checking the first demodulation result in a cyclic redundancy check (CRC) manner, and
    wherein the second check result is obtained by checking the second demodulation result in the CRC manner; and
    determining, by the first base station, a correct demodulation result of demodulating the uplink data in response to the first base station already receiving the first PCC scheduling result sent by the second base station,
        wherein the determination is based on the (i) first PCC scheduling result, (ii) the first and second demodulation results and (iii) the first and second check results.

2. The method according to claim 1, wherein determining the correct demodulation result comprises:
    determining the correct demodulation results based on the second demodulation result and the second check result in response to the first PCC scheduling result indicates that the uplink scheduling is performed on the PCC of the UE at the periodic CQI reporting moment.

3. The method according to claim 1, further comprising:
    determining, by the first base station and based on the first and second check results, whether there is a correct checked demodulation result between the first and second demodulation results in response to the first base station not receiving the first PCC scheduling result from the second base station when the demodulation is completed; and determining, by the first base station, the correct checked demodulation result in response to correctly demodulating the uplink data on the SCC and the first base station determines the correct checked demodulation result between the first and second demodulation results.

4. The method according to claim 3, further comprising:
determining, by the first base station, first and second demodulation data in response to the first base station determining there is no correct checked demodulation result in the first demodulation result and the second demodulation results,
  wherein the first demodulation data is data on which hybrid automatic repeat request (HARQ) combination can be performed and is obtained in a process of demodulating the uplink data based on the first demodulation format, and
  wherein the second demodulation data is data on which the HARQ combination can be performed and is obtained in a process of demodulating the uplink data based on the second demodulation format;
sending, by the first base station, an HARQ retransmission indication to the UE and waiting, by the first base station, to receive the first PCC scheduling result sent by the second base station,
wherein the HARQ retransmission indication instructs the UE to send HARQ retransmission data based on the SCC;
selecting, by the first base station, first target demodulation data from the first and second demodulation data based on the first PCC scheduling result in response to receiving the first PCC scheduling result sent by the second base station,
  wherein the first target demodulation data is demodulation data in a correct demodulation format that is indicated by the first PCC scheduling result;
demodulating, by the first base station, the HARQ retransmission data based on the first and second demodulation formats and, obtaining from the demodulation, third and fourth demodulation data on which a HARQ combination can be performed in response to receiving the HARQ retransmission data sent by the UE;
performing, by the first base station, the HARQ combination on the third and fourth demodulation data with the first target demodulation data, and determining first and second combination demodulation results based on demodulation data obtained after the HARQ combination in response to the first base station not receiving, during the demodulation of the HARQ retransmission data, a second PCC scheduling result sent by the second base station,
  wherein the second PCC scheduling result indicates whether uplink scheduling is performed on the PCC of the UE at an HARQ retransmission data moment;
checking, by the first base station, the first and second combination demodulation results in the CRC manner; and
re-sending an HARQ retransmission indication to the UE and waiting to receive a PCC scheduling result sent by the second base station until a quantity of times of sending the HARQ retransmission indication to the UE reaches a preset quantity in response to determining, through the check, that there is no correct checked demodulation result in the first and second combination demodulation results.

5. The method according to claim 4, further comprising:
selecting, by the first base station, second target demodulation data from the third and fourth demodulation data based on the second PCC scheduling result in response to the first base station having already received, during the demodulation, the second PCC scheduling result sent by the second base station,
  wherein the second target demodulation result is demodulation data in the correct demodulation format that is indicated by the second PCC scheduling result;
performing, by the first base station, the HARQ combination on the first and second target demodulation data, and determining a third combination demodulation result based on demodulation data obtained after the combination; and
determining, by the first base, the demodulation result of correctly demodulating the uplink data on the SCC based on the third combination demodulation result.

6. The method according to claim 4, further comprising:
determining, by the first base station, that correct check demodulation result as the demodulation result of correctly demodulating the uplink in response to determining, through the check, a correct checked demodulation result in the first and second combination demodulation result.

7. The method according to claim 1, wherein determining, based on the first PCC scheduling result, the first demodulation result, the second demodulation result, the first check result, and the second check result, the demodulation result of correctly demodulating the uplink data comprises:
  in response to the first PCC scheduling result indicating that no uplink scheduling is performed on the PCC of the UE at the periodic CQI reporting moment, determining, based on the first demodulation result and the first check result, the demodulation result of correctly demodulating the uplink data.

8. A carrier aggregation-based demodulation apparatus applied to a first base station, comprising at least one processor and a memory coupled to the at least one processor, the memory having processor-readable instructions stored thereon, which when executed, cause the at least one processor to:
  upon having received uplink data from user equipment (UE) based on a scheduled secondary component carrier (SCC), determine whether a current moment is a periodic channel quality indicator (CQI) reporting moment;
  upon the current moment being the periodic CQI reporting moment and upon not having received a first primary component carrier (PCC) scheduling result of the UE sent by a second base station when a demodulation format used for demodulating the uplink data on the SCC needs to be determined before the current moment, demodulate the uplink data, respectively based on a first demodulation format and a second demodulation format, to obtain a first demodulation result, a second demodulation result, a first check result, and a second check result,
    wherein the first PCC scheduling result indicates whether uplink scheduling is performed on a PCC of the UE at the periodic CQI reporting moment,
    wherein the first demodulation format is a demodulation format used when there is periodic CQI channel associated signaling on a physical uplink shared channel (PUSCH) of the SCC, wherein the second demodulation format is a demodulation format used when there is no periodic CQI channel associated signaling on the PUSCH of the SCC, and wherein the first check result is obtained by checking the first demodulation result in a cyclic redundancy check (CRC) manner, and wherein the second check result is obtained by checking the second demodulation result in the CRC manner; and upon having received the first PCC scheduling result sent by the second base station when the demodulation is completed, determine, based on the first PCC scheduling result, the first demodulation result, the second demodulation result, the first check result, and the second check result, a demodulation result of correctly demodulating the uplink data.

9. The apparatus according to claim 8, wherein the at least one processor is further configured to:

upon the first PCC scheduling result indicating that the uplink scheduling is performed on the PCC of the UE at the periodic CQI reporting moment, determine, based on the second demodulation result and the second check result, the demodulation result of correctly demodulating the uplink data.

10. The apparatus according to claim 8, wherein the at least one processor is further configured to:

upon not having received the first PCC scheduling result sent by the second base station when the demodulation is completed, determine, based on the first check result and the second check result, whether there is a correct checked demodulation result in the first demodulation result and the second demodulation result; and in response to a correct checked demodulation result being in the first demodulation result and the second demodulation result, determine the correct checked demodulation result as the demodulation result of correctly demodulating the uplink data on the SCC.

11. The apparatus according to claim 10, wherein the at least one processor is further configured to:

in response to no correct checked demodulation result being in the first demodulation result and the second demodulation result, determine first demodulation data and second demodulation data, wherein the first demodulation data is data on which hybrid automatic repeat request (HARQ) combination can be performed and that is obtained in a process of demodulating the uplink data based on the first demodulation format, and wherein the second demodulation data is data on which HARQ combination can be performed and that is obtained in a process of demodulating the uplink data based on the second demodulation format;

send an HARQ retransmission indication to the UE, and wait to receive the first PCC scheduling result sent by the second base station, wherein the HARQ retransmission indication instructs the UE to send HARQ retransmission data based on the SCC;

upon having received the first PCC scheduling result, select first target demodulation data from the first demodulation data and the second demodulation data based on the first PCC scheduling result, wherein the first target demodulation data is demodulation data in a correct demodulation format that is indicated by the first PCC scheduling result;

upon having received the HARQ retransmission data sent by the UE, demodulate the HARQ retransmission data respectively based on the first demodulation format and the second demodulation format, and obtain, from a demodulation process, third demodulation data and fourth demodulation data on which HARQ combination can be performed;

in response to not having received a second PCC scheduling result sent by the second base station during the demodulation, perform HARQ combination on the third demodulation data and the fourth demodulation data respectively with the first target demodulation data, and determine a first combination demodulation result and a second combination demodulation result based on demodulation data obtained after the combination, wherein the second PCC scheduling result indicates whether uplink scheduling is performed on the PCC of the UE at an HARQ retransmission data moment; and check the first combination demodulation result and the second combination demodulation result respectively in the CRC manner, and upon determining, through the check, that there is no correct checked demodulation result in the first combination demodulation result and the second combination demodulation result, re-send an HARQ retransmission indication to the UE, and wait to receive a PCC scheduling result sent by the second base station, until a quantity of times of sending the HARQ retransmission indication to the UE reaches a preset quantity.

12. The apparatus according to claim 10, wherein the at least one processor is further configured to:

after having received the second PCC scheduling result sent by the second base station during the demodulation, select second target demodulation data from the third demodulation data and the fourth demodulation data based on the second PCC scheduling result, wherein the second target demodulation result is demodulation data in the correct demodulation format that is indicated by the second PCC scheduling result;

perform HARQ combination on the first target demodulation data and the second target demodulation data, and determine a third combination demodulation result based on demodulation data obtained after the combination; and determine, based on the third combination demodulation result, the demodulation result of correctly demodulating the uplink data on the SCC.

13. The apparatus according to claim 11, wherein the at least one processor is further configured to:

upon determining, through the check, that there is a correct checked demodulation result in the first combination demodulation result and the second combination demodulation result, determine the correct checked demodulation result as the demodulation result of correctly demodulating the uplink data.

14. The apparatus according to claim 8, wherein the at least one processor is further configured to:

in response to the first PCC scheduling result indicating that no uplink scheduling is performed on the PCC of the UE at the periodic CQI reporting moment, determine, based on the first demodulation result and the first check result, the demodulation result of correctly demodulating the uplink data.

15. A non-transitory computer-readable storage medium, comprising a processor-executable program, which when being executed by a processor, cause the processor to implement operations including:

upon having received uplink data sent by user equipment (UE) based on a scheduled secondary component carrier (SCC), determine whether a current moment is a periodic channel quality indicator (CQI) reporting moment;

upon the current moment being the periodic CQI reporting moment and upon not receiving a first primary component carrier (PCC) scheduling result of the UE sent by a second base station when a demodulation format used for demodulating the uplink data on the SCC needs to be determined before the current moment, demodulate the uplink data, respectively based on a first demodulation format and a second demodulation format, to obtain a first demodulation result, a second demodulation result, a first check result, and a second check result, wherein the first PCC scheduling result indicates whether uplink scheduling is performed on a PCC of the UE at the periodic CQI reporting moment, wherein the first demodulation format is a demodulation format used when there is periodic CQI channel associated signaling on a physical uplink shared channel (PUSCH) of the SCC, wherein the second demodulation format is a demodulation format used when there is no periodic CQI channel associated signaling on the PUSCH of the SCC, wherein the first check result is obtained by checking the first demodulation result in a cyclic redundancy check (CRC) manner, and wherein the second check result is obtained by checking the second demodulation result in the CRC manner; and if the first PCC scheduling result sent by the second base station is already received when the demodulation is completed, determine, based on the first PCC scheduling result, the first demodulation result, the second demodulation result, the first check result, and the second check result, a demodulation result of correctly demodulating the uplink data.

16. The non-transitory computer-readable storage medium according to claim 15, wherein the at least one processor is further configured to:

in response to the first PCC scheduling result indicating that the uplink scheduling is performed on the PCC of the UE at the periodic CQI reporting moment, determine, based on the second demodulation result and the second check result, the demodulation result of correctly demodulating the uplink data; or in response to the first PCC scheduling result indicating that no uplink scheduling is performed on the PCC of the UE at the periodic CQI reporting moment, determine, based on the first demodulation result and the first check result, the demodulation result of correctly demodulating the uplink data.

17. The non-transitory computer-readable storage medium according to claim 15, wherein the at least one processor is further configured to:

upon not having received the first PCC scheduling result sent by the second base station when the demodulation is completed, determine, based on the first check result and the second check result, whether there is a correct checked demodulation result in the first demodulation result and the second demodulation result; and in response to there being a correct checked demodulation result in the first demodulation result and the second demodulation result, determine the correct checked demodulation result as the demodulation result of correctly demodulating the uplink data on the SCC.

18. The non-transitory computer-readable storage medium according to claim 17, wherein the at least one processor is further configured to:

in response to there being no correct checked demodulation result in the first demodulation result and the second demodulation result, determine first demodulation data and second demodulation data, wherein the first demodulation data is data on which hybrid automatic repeat (HARQ) combination can be performed and that is obtained in a process of demodulating the uplink data based on the first demodulation format, and wherein the second demodulation data is data on which HARQ combination can be performed and that is obtained in a process of demodulating the uplink data based on the second demodulation format;

send an HARQ retransmission indication to the UE, and wait to receive the first PCC scheduling result sent by the second base station, wherein the HARQ retransmission indication instructs the UE to send HARQ retransmission data based on the SCC;

upon receipt of the first PCC scheduling result, select first target demodulation data from the first demodulation data and the second demodulation data based on the first PCC scheduling result, wherein the first target demodulation data is demodulation data in a correct demodulation format that is indicated by the first PCC scheduling result;

upon having received the HARQ retransmission data sent by the UE, demodulate the HARQ retransmission data respectively based on the first demodulation format and the second demodulation format, and obtain, from a demodulation process, third demodulation data and fourth demodulation data on which HARQ combination can be performed;

upon not having received a second PCC scheduling result sent by the second base station is not received during the demodulation, perform HARQ combination on the third demodulation data and the fourth demodulation data respectively with the first target demodulation data, and determine a first combination demodulation result and a second combination demodulation result based on demodulation data obtained after the combination, wherein the second PCC scheduling result indicates whether uplink scheduling is performed on the PCC of the UE at a HARQ retransmission data moment; and check the first combination demodulation result and the second combination demodulation result respectively in the CRC manner, and upon determining, through the check, that there is no correct checked demodulation result in the first combination demodulation result and the second combination demodulation result, re-send an HARQ retransmission indication to the UE, and wait to receive a PCC scheduling result sent by the second base station, until a quantity of times of sending an HARQ retransmission indication to the UE reaches a preset quantity.

19. The non-transitory computer-readable storage medium according to claim 18, wherein the at least one processor is further configured to:

upon having received the second PCC scheduling result sent by the second base station during the demodulation, select second target demodulation data from the third demodulation data and the fourth demodulation data based on the second PCC scheduling result, wherein the second target demodulation result is demodulation data in the correct demodulation format that is indicated by the second PCC scheduling result;

perform HARQ combination on the first target demodulation data and the second target demodulation data, and determine a third combination demodulation result based on demodulation data obtained after the combination; and determine, based on the third combination demodulation result, the demodulation result of correctly demodulating the uplink data on the SCC.

20. The non-transitory computer-readable storage medium according to claim 18, wherein the at least one processor is further configured to:

upon determining, through the check, that there is a correct checked demodulation result in the first combination demodulation result and the second combination demodulation result, determine the correct checked demodulation result as the demodulation result of correctly demodulating the uplink data.

* * * * *